US007783538B1

(12) United States Patent
Ramsey et al.

(10) Patent No.: US 7,783,538 B1
(45) Date of Patent: Aug. 24, 2010

(54) METHOD FOR EQUITABLY DISTRIBUTING A PLURALITY OF INSTRUMENTS BETWEEN A PLURALITY OF ACCOUNTS

(75) Inventors: Neil P. Ramsey, Louisville, KY (US); Chris W. Satterfield, Simpsonville, KY (US); Sean Yu, Fisherville, KY (US); Richard Boerke, Jr., Kenilworth, IL (US)

(73) Assignee: Barclays Capital Inc., New York, NY (US)

( * ) Notice: Subject to any disclaimer, the term of this patent is extended or adjusted under 35 U.S.C. 154(b) by 1441 days.

(21) Appl. No.: 11/052,670

(22) Filed: Feb. 7, 2005

(51) Int. Cl.
*G06Q 40/00* (2006.01)
(52) U.S. Cl. .................... 705/35; 705/36 R; 705/37
(58) Field of Classification Search ............... 705/36 R
See application file for complete search history.

(56) References Cited

U.S. PATENT DOCUMENTS

| | | | | |
|---|---|---|---|---|
| 4,313,507 | A * | 2/1982 | Hays .............................. | 177/1 |
| 5,563,783 | A * | 10/1996 | Stolfo et al. .................... | 705/8 |
| 5,924,091 | A * | 7/1999 | Burkhard ........................ | 707/7 |
| 2003/0225660 | A1 * | 12/2003 | Noser et al. .................... | 705/36 |
| 2004/0024677 | A1 * | 2/2004 | Wallman ....................... | 705/36 |
| 2006/0161546 | A1 * | 7/2006 | Callaghan et al. .............. | 707/7 |
| 2007/0192223 | A1 * | 8/2007 | Cifrese et al. .............. | 705/36 R |

OTHER PUBLICATIONS

Barron's, Dictionary of Finance and Investment Terms, Fifth Edition, 1998, p. 356.*

65 F.R. 4807—Average Price Calculations by Futures Commission Merchants, Feb. 1, 2000.*
"Average Pricing," http://www.sfe.com.au/content/bulletins/sfe/sfe1999_206.pdf, Jul. 30, 1999, retrieved on Apr. 17, 2009.*
"Brute Force Search," Wikipediahttp://en.wikipedia.org/wiki/Brute_force_search, retrieved Apr. 15, 2009 from the Jan. 18, 2005 version using the history archive within Wikipedia.*
"Greedy algorithm," Wikipedia, http://en.wikipedia.org/wiki/Greedy_algorithm, retrieved Apr. 15, 2009 from the Oct. 6, 2004 version using the history archive within Wikipedia.*

* cited by examiner

*Primary Examiner*—Charles R Kyle
*Assistant Examiner*—David L Wood
(74) *Attorney, Agent, or Firm*—Morgan Lewis & Bockius LLP (57) ABSTRACT

A plurality of instruments are equitably distributed between a plurality of accounts. One implementation includes: calculating an overall average value for the instruments, and determining the best allocation for the instruments by iteratively distributing the instruments in the accounts and evaluating the errors between the accounts and the average instrument value for each allocation. Another implementation includes sorting the accounts into a first group having an account average instrument value greater than the overall average instrument value, a second group having an account average instrument value less than the overall average instrument value, and a third group where the values are equal. Then, improved distributions are attempted by exchanging instruments between accounts in the first group and accounts in the second group. The process is iterative until all possible instrument combinations between the first group and the second group have been tried and no further improvements can be made.

22 Claims, 8 Drawing Sheets

FIG. 1

| Account | Total investment value | Number of instruments to purchase |
|---------|------------------------|-----------------------------------|
| Account_1 | $5,000,000 | 5 |
| Account_2 | $3,000,000 | 3 |
| Account_3 | $2,000,000 | 2 |

Total      $10,000,000      10

FIG. 2

Instruments 6 at $1,140.20

2 at $1,140.50

2 at $1,140.10

10 at an Average Instrument Value of $1,140.44

Account_1

1. $1,140.20
2. $1,140.20
3. $1,140.50
4. $1,140.50
5. $1,140.10

Account_2

1. $1,140.20
2. $1,140.20
3. $1,140.50

Account_3

1. $1,140.10
2. $1,140.50

Current average
= $1,140.50

Current average
= $1,140.30

Current average
= $1,140.80

Greater than
Average Instrument
Value
($1,140.44)

Less than
Average Instrument
Value

Greater than
Average Instrument
Value

Second error
= 0.14

First error
= 0.36

Select Account_2, Position_1 for exchange,
$1,140.20

Look for prices in Account_3 between
$1,140.20 and
$1,140.20 + (2(3($1,140.44-$1,140.30)))
= $1,140.04

Thus, select Account_3, Position_2
for exchange    $1,140.50

FIG. 5

Account_2

| 1. $1,140.50 |
| 2. $1,140.20 |
| 3. $1,140.50 |

Account_3

| 1. $1,140.10 |
| 2. $1,140.20 |

Current average
= $1,140.40

Current average
= $1,140.65

New second error
= 0.04

New first error
= 0.21

Is (0.21 + 0.04) < (0.36 + 0.14) ?

Is 0.25 < 0.50 ?

YES

METHOD FOR EQUITABLY DISTRIBUTING A PLURALITY OF INSTRUMENTS BETWEEN A PLURALITY OF ACCOUNTS

CROSS-REFERENCE TO RELATED APPLICATIONS

None.

BACKGROUND OF THE INVENTION

A. Field of Invention

This invention relates to equitably distributing a plurality of executed orders between a plurality of accounts.

B. Description of Related Art

Figure 1:
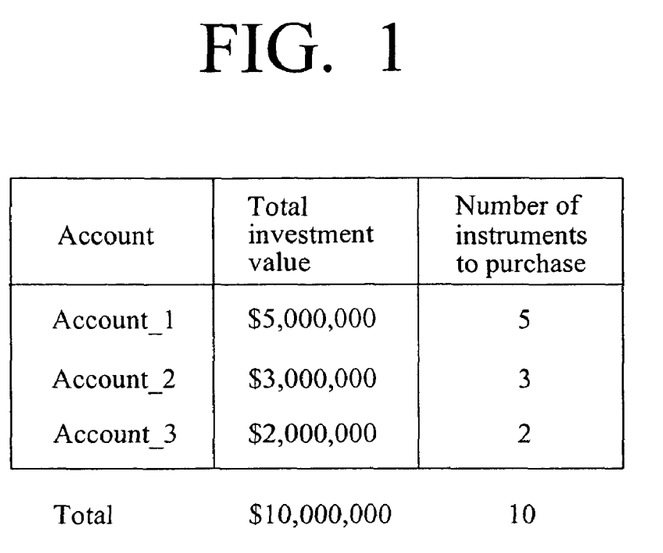
FIG. 1 is an illustration of a representative portfolio of multiple client accounts, such as might be managed by an Investment Manager or Trader.
Figure 2:
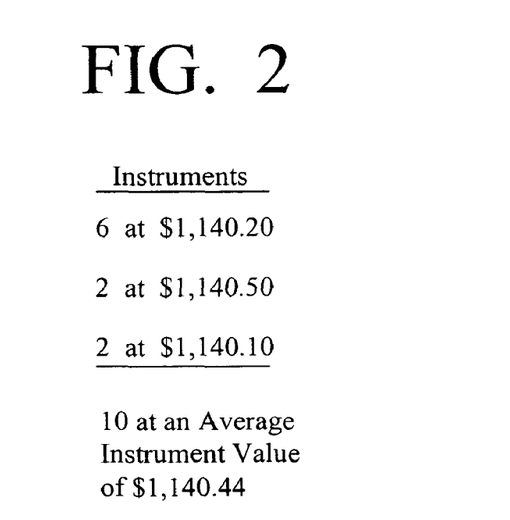
FIG. 2 is an illustration of a number of instruments purchased for the portfolio of FIG. 1 and requiring equitable distribution into the client accounts.

Investment Managers or Traders manage portfolios for their clients. Portfolios may include investments in futures, options, equities, foreign exchange investments (FOREXs), bonds, derivatives, etc. For the purposes of the discussion that follows, these investments will be collectively referred to as "instruments". Typically, an Investment Manager or Trader will manage the portfolios of multiple client accounts using a common strategy. For example, as shown in FIG. 1, an Investment Manager or Trader may manage three accounts, ACCOUNT_1, ACCOUNT_2, AND ACCOUNT_3, where each account has a different total investment value. In the example shown, ACCOUNT_1 has a total investment value of $5,000,000, ACCOUNT_2 has a total investment value of $3,000,000, and ACCOUNT_3 has a total investment value of $2,000,000. The Investment Manager or Trader may then research a particular investment in certain instruments, and decide to invest a portion of each of the client portfolios in the investment by purchasing a number of the instruments for each account. Often, as shown in the example, the portion of each portfolio to be invested is selected in relation to the total amount in each portfolio. Thus, in the example shown, the Investment Manager or Trader decides to purchase five instruments for ACCOUNT_1, three instruments for ACCOUNT_2, and two instruments for ACCOUNT_3, for a total of ten instruments. It is often the case, however, that all of the instruments are not available at a common price. Continuing with the example, as shown in FIG. 2, the Investment Manager or Trader may acquire six instruments at $1,140.20, two instruments at $1,140.50, and two instruments at $1,141.10. Since all of the instruments were not available at a common price, the Investment Manager or Trader must determine how to equitably distribute the instruments between the accounts. Each instrument may also be referred to as an "executed order".

The Chicago Mercantile Exchange offers a system known as the Average Pricing System (APS) for such a purpose. The primary function of the APS is to allow clearing member firms, in defined circumstances, to confirm an average price to customers when multiple prices are received on the execution of an order, or a series of orders, during a single trading day. The APS calculates an average price for each order. Then, the APS calculates a cash residual associated with each instrument. The cash residual is defined as the dollar difference between the actual trade price and the average price. Thus, the instruments can be distributed to client accounts with the cash residuals for each instrument to provide an equitable distribution.

However, the use of the cash residuals is cumbersome for all of the parties involved, and is often confusing for the clients. Thus, there remains a need for a method of equitably distributing a plurality of instruments between a plurality of accounts that does not require calculation of the cash residual associated with each instrument, and, thus, does not have to account for such cash residual.

SUMMARY OF THE INVENTION

The method of the present invention meets these needs, and others, by equitably distributing a plurality of instruments between a plurality of accounts. Advantageously, the method is applicable to any exchange traded instrument. Further, the method is superior to existing Average Pricing Systems in that it eliminates the need to utilize cash residuals in order to obtain an equitable distribution.

In accordance with one aspect, the method includes the steps of: calculating an average instrument value for the instruments; and determining the best allocation for the instruments by iteratively distributing the instruments in the accounts and evaluating the errors between the accounts and the average instrument value for each allocation.

According to one implementation, the step of determining the best allocation for the instruments further comprises the steps of: a) distributing the instruments in the accounts; b) calculating an error for each account and an overall error for the allocation; c) redistributing the instruments in the accounts to produce a different instrument allocation; d) calculating a new error for each account and a new overall error for the allocation; and e) selecting the allocation having the lowest overall error for distribution of the instruments. This implementation could further comprise the steps of: f) determining if the overall error for the selected allocation is zero; if so, then stopping as the allocation cannot be improved; and, if not, then proceeding to step g); and g) determining if all possible allocations have been evaluated; if so, then stopping as the allocation cannot be improved; and, if not, then returning to step c) to evaluate a different instrument allocation.

In accordance with one implementation of the method performed on a computing device, the method comprises the steps of: a) calculating an average instrument value for all of the instruments; b) defining memory locations representing the accounts and instrument positions within the accounts; c) distributing the values of the instruments into the memory locations, thus creating a representative allocation of the instruments; d) calculating an error for each representative account and an overall error for the representative allocation; e) redistributing the values of the instruments into the memory locations to produce a different representative allocation; f) calculating a new error for each representative account and a new overall error for the representative allocation; and g) selecting the representative allocation having the lowest overall error for distributing the instruments to the accounts. This implementation could still further include the steps of: h) determining if the overall error for the selected representative allocation is zero; if so, then distributing the instruments according to the representative allocation; and, if not, then proceeding to step i); and i) determining if all possible representative allocations have been evaluated; if so, then distributing the instruments according to the representative allocation; and, if not, returning to step d) to evaluate a different representative allocation.

In accordance with another aspect, the method includes the steps of: a) calculating an average instrument value for the acquired instruments; b) distributing the instruments randomly into instrument positions in the accounts; c) sorting the accounts into: a first group where the current average value of the account is greater than the average instrument value; a second group where the current average value of the account is less than the average instrument value; and a third group where the current average value of the account is equal to the average instrument value; d) selecting a first account from the first group and a second account from the second group; e) calculating a first error as the difference between the current average value for the first account and the average instrument value, and a second error as the difference between the average instrument value and the current average value for the second account; f) exchanging an instrument in the second account with an instrument in the first account; g) calculating a new first error as the difference between the new current average value for the first account and the average instrument value, and a new second error as the difference between the average instrument value and the new current average value for the second account; h) determining if the sum of the new first error and the new second error is less than the sum of the first error and the second error, such that the exchange has improved the distribution; if so, then returning to step c) to reevaluate the distribution and attempt further improvement; and if not, then returning the exchanged instruments to their respective accounts; i) determining if all possible instrument combinations between the first group and the second group have been evaluated; if not, then returning to step d) to select a different instrument combination; and if so, then stopping as no further improvements can be made.

Preferably, the step of selecting a first account and a second account includes selecting the account with the largest current average from the first group, and selecting the account with the smallest current average from the second group. Then, the step of exchanging instruments includes: selecting a second instrument in the second account; selecting a first instrument in the first account having a value between the value of the second instrument and the sum of the value of the second instrument and two times the number of instruments in the second group times the result of: the difference between the average instrument value and the current average value for the second account; and exchanging the second instrument with the first instrument. Further, where there are at least two instruments in the first account that have a value within the range described, the step of exchanging instruments includes selecting the smallest instrument within the range described as the first instrument.

In accordance with another implementation of the method performed on a computing device, the method includes the steps of: a) calculating an overall average instrument value for all of the instruments; b) defining memory locations representing the accounts and instrument positions within the accounts; c) randomly distributing the values of the instruments into the instrument position memory locations, thus creating a representative distribution of the instruments; d) calculating account average instrument values for each representative account; e) sorting the representative accounts into: a first group where the account average instrument values are greater than the overall average instrument value; a second group where the account average instrument values are less than the overall average instrument value; and a third group where the account average instrument values are equal to the overall average instrument value; f) selecting a first representative account from the first group, and calculating errorA as the difference between the account average instrument value for the first account and the overall average instrument value; g) selecting a second representative account from the second group, and calculating errorB as the difference between the overall average instrument value and the account average instrument value for the second account; h) exchanging an instrument value in the second account with an instrument value in the first account, and recalculating account average instrument values for each of the first account and the second account; i) calculating new_errorA as the difference between the new account average instrument value for the first account and the overall average instrument value; and calculating new_errorB as the difference between the overall average instrument value and the new account average instrument value for the second account; j) determining if new_errorA plus new_errorB is less than errorA plus errorB, such that the exchange has resulted in an improved distribution: if so, then returning to step e) to reevaluate the improved distribution and attempt further improvement; and if not, then returning the exchanged instrument values to their original accounts; k) determining if all possible instrument value combinations between the first group and the second group have been tried: if not, then returning to step f) to select a different instrument value combination; and if so, then distributing the instruments to the accounts according to the representative distribution.

Preferably, the step of selecting a first representative account includes selecting the account with the largest average instrument value, the step of selecting a second representative account includes selecting the account with the smallest average instrument value, and the step of exchanging instrument values includes: selecting a second instrument value in the second account; selecting a first instrument value in the first account having a value between the value of the second instrument and the value of the second instrument plus two times the number of instruments in the second account times the result of: the difference between the overall average instrument value and the account average instrument value for the second account; and exchanging the second instrument value with the first instrument value. Further, where there are at least two instrument values in the first account that fall within the range described, the step of exchanging instrument values includes selecting the smallest instrument value within the range described in the first account as the first instrument value.

The steps of the invention may be found as executable instructions in computer software contained on a computer readable medium. Further, other features and advantages of the invention will be described in, or apparent from, the following detailed description of exemplary embodiments of the invention.

DETAILED DESCRIPTION OF EXEMPLARY EMBODIMENTS

Figure 3:
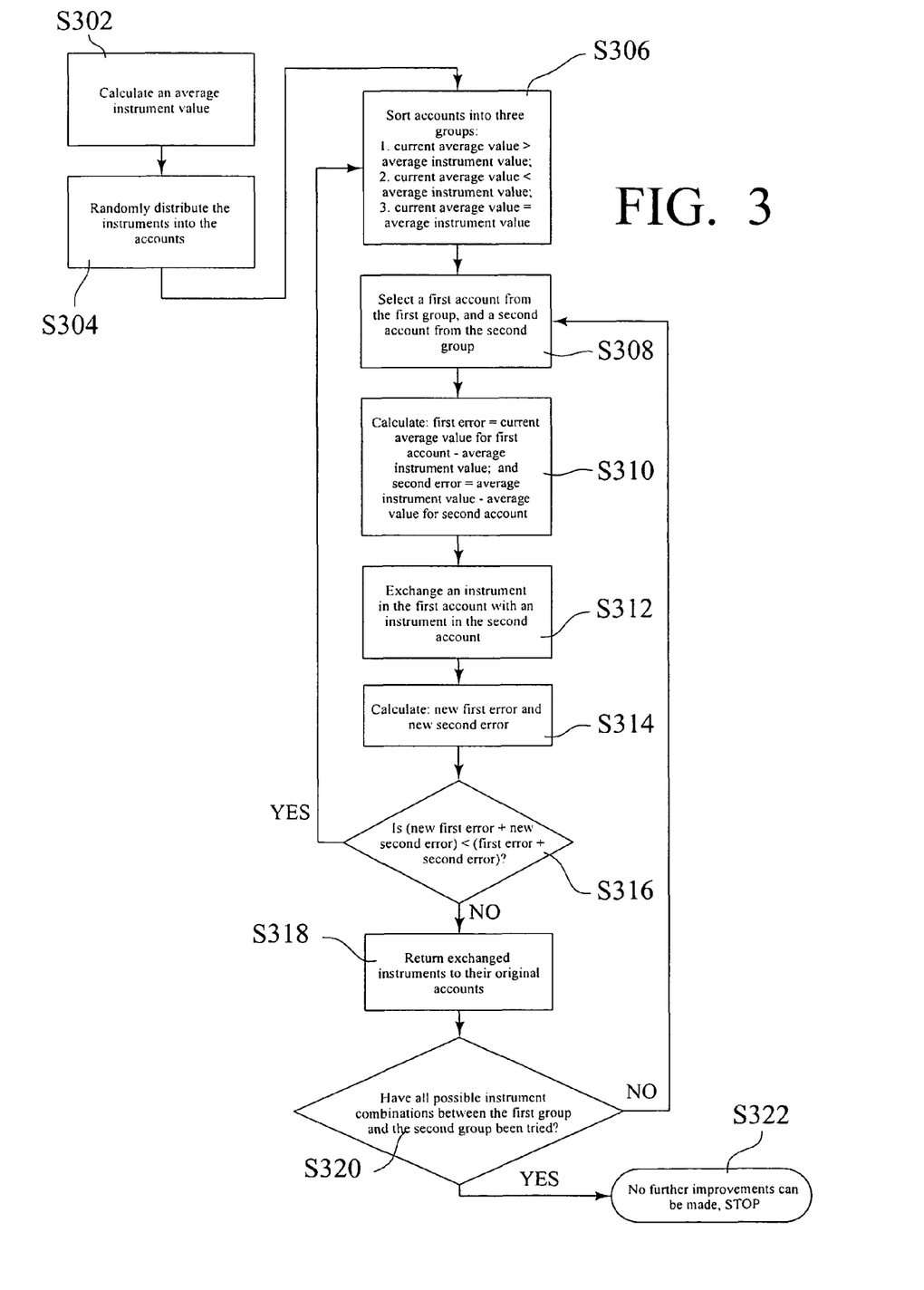
FIG. 3 is a flow chart of an exemplary method for equitably distributing a plurality of instruments between a plurality of accounts, according to the invention.

FIG. 3 is a flow diagram of steps in an exemplary method for equitably distributing a plurality of instruments between a plurality of accounts. Most likely, the instruments will have at least some differing values. As mentioned above, the accounts will most likely have differing allocations of instruments, depending on the numbers of instruments purchased for each account. Thus, the method of the invention is directed to distribution of the purchased instruments among the accounts.

The examples discussed herein use a small number of accounts for illustration. However, it will be readily apparent that the method will handle any number of accounts with any number of total instruments, practically limited only by the resources to execute the method. In practice, the method will likely be used to manage tens or hundreds of accounts, with hundreds or thousands of total instruments to be distributed.

As will be shown, the iterative nature of the method makes the use of a computing device a practical and preferred resource for the method. However, it should also be understood that other resources could be utilized for executing the method, and no limitations on the claimed invention are to be taken from this detailed description of exemplary embodiments.

As a first step S302 of the method, an average value of all of the instruments to be distributed is calculated. The average instrument value represents the target average for the instruments ultimately distributed to each account for a completely even distribution of the instruments between the accounts.

Returning to the example shown in FIG. 2, the average instrument value of the ten instruments to be distributed is shown as having been calculated as $1,140.44.

Returning now to FIG. 3, as a next step S304, the instruments are randomly distributed into the accounts. Each account has a number of instrument positions equal to the number of instruments purchased for the respective account. Thus, in step S304, the instruments are distributed into the instrument positions in the accounts.

The next step S306 is sorting the accounts into three groups of accounts. The first group consists of accounts where the current average value of the instruments is greater that the average instrument value. The second group consists of accounts where the current average value of the instruments is less than the average instrument value. The third group consists of accounts where the current average value of the instruments is equal to the average instrument value.

The next step S308 is selecting a first account from the first group and a second account from the second group, in order to attempt to improve the distribution between the two accounts. To further improve or speed up the process, the account that has the largest current average value should be selected as the first account, and the account that has the smallest current average value should be selected as the second account.

The next step S310 is calculating: 1) a first error as the difference between the current average value for the first account and the average instrument value; and 2) a second error as the difference between the average instrument value and the current average value for the second account.

The next step S312 is exchanging an instrument in the second account with an instrument in the first account, in an effort to improve the distribution between the accounts. Thus, an element may first be selected from the second account. Then, to further speed up the process, the only prices in the first account to be considered for exchange should be between the value of the instrument selected from the second account and the value of the instrument selected from the second account plus the result of: two times the number of elements in the second account times the difference between the average instrument value and the current average value for the second account. This has been determined to be the maximum range that can improve the second account's average instrument value. If there is more than one instrument value falling in this range, then the instrument with the smallest value should be selected.

The next step S314 is calculating: 1) a new first error as the absolute value of difference between the current average value for the first account and the average instrument value; and 2) a new second error as the absolute value of difference between the average instrument value and the current average value for the second account. The absolute value limitation is added when calculating the new first error and the new second error, since the exchange may result in the new errors having a negative value.

The next step S316 is determining if the sum of the new first error and the new second error is less than the sum of the first error and the second error, such that the exchange has improved the distribution. If the exchange has improved the distribution, then the method returns to the step S306 of sorting the accounts into three groups to reevaluate the distribution and attempt further improvement.

If the exchange has not improved the distribution, then the exchanged instruments are returned to their original accounts in the next step S318. The next step S320 is to begin an iterative process to evaluate all instrument value combinations between the first group and the second group until an improvement can be made. If all possible instrument combinations have been tried without success, then no further improvement in the distribution can the made and the process can end in step S322. If, however, all combinations have not been attempted, the method at this point returns to steps S308, S310, S312, S314 and S316 to reselect a different combination of instruments for exchange and evaluation.

Figure 4:
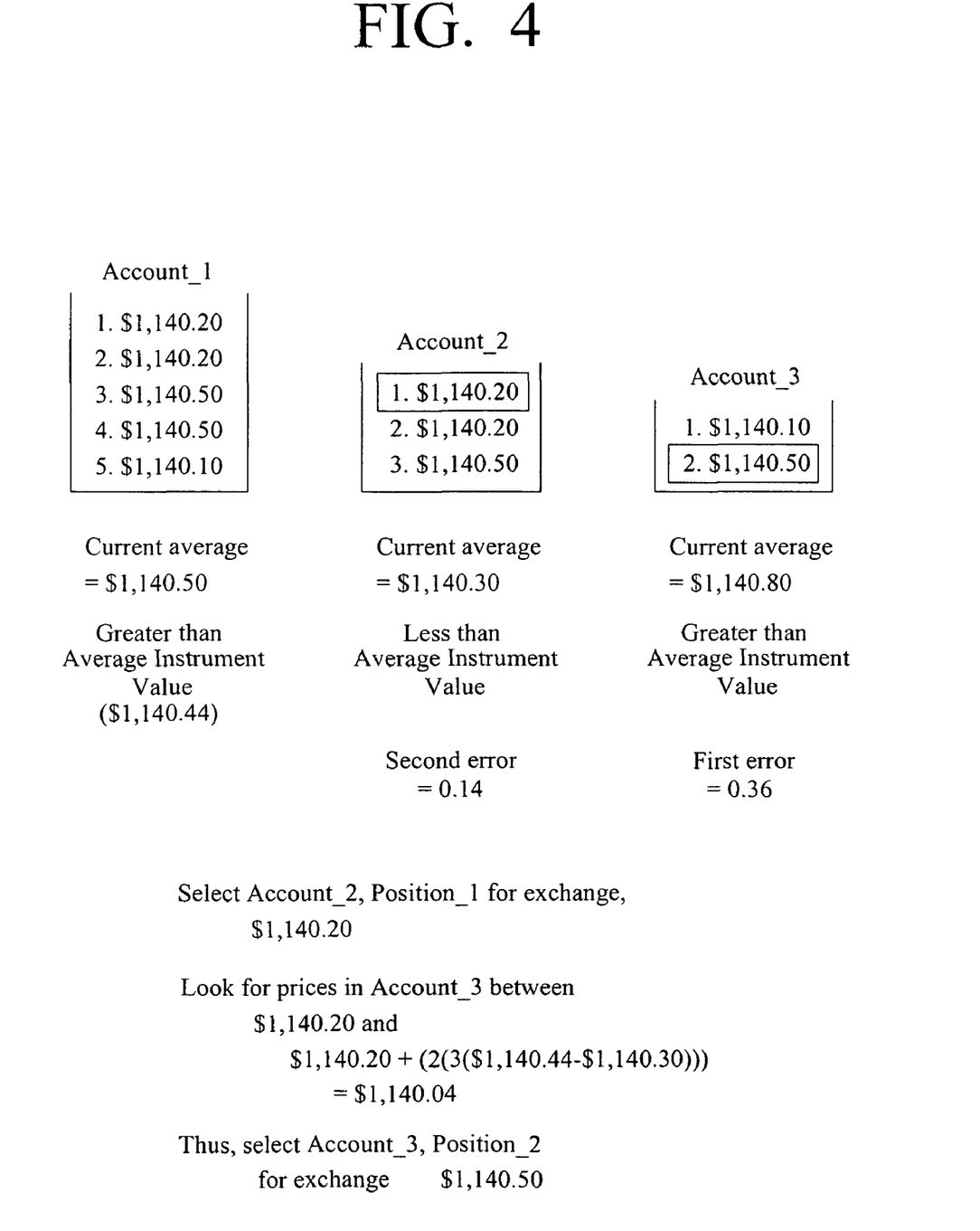
FIG. 4 is an illustration of a random distribution of the instruments of FIG. 2 into instrument positions in the client accounts, calculation of account average instrument values, and selection of instruments for exchange, according to the method of FIG. 3.

Turning now to FIG. 4 and continuing with the example described above, ACCOUNT_1, ACCOUNT_2, and ACCOUNT_3 are shown as having appropriate numbers of instrument positions corresponding to the numbers of investments purchased for each account. Thus, according to the exemplary method described above, the purchased instruments shown in FIG. 2 are randomly distributed into the instrument positions in the accounts.

The example shows the current average value of the instruments in each account, or the current average value of each account, positioned below each account. More specifically, the current average value of the instruments in ACCOUNT_1 is shown as $1,140.50. Likewise, the current average value of the instruments in ACCOUNT_2 is shown as $1,140.30; and the current average value of the instruments in ACCOUNT_3 is shown as $1,140.80. Thus, the current average values of ACCOUNT_1 and ACCOUNT_3 are greater than the average instrument value of $1,140.44; and the current average value of ACCOUNT_2 is less than the average instrument value.

ACCOUNT_3 has the largest current average value, and ACCOUNT_2 has the smallest current average value. Thus, following the steps of the exemplary method, ACCOUNT_3 and ACCOUNT_2 are selected as the best initial accounts for attempted improvement. As shown, the first error is calculated to be 0.36; and the second error is calculated to be 0.14.

The next step is exchanging an instrument in ACCOUNT_2 with an instrument in ACCOUNT_3. In the example shown, the instrument in POSITION_1 of ACCOUNT_2, having a value of $1,140.20, is selected for exchange. Then, following the exemplary method, the instruments in ACCOUNT_3 having a value in the range between $1,140.20 and $1,141.04 are considered for exchange with the selected instrument from ACCOUNT_2. The upper end of this range is determined using the formula two times the number of elements in the second account (in this example, three) times the difference between the average instrument value ($1,140.44) and the current average value for ACCOUNT_2 ($1,140.30). As shown, this value is determined to be $1,141.04. In the example shown, the instrument in POSITION_2 of ACCOUNT_3, or $1,140.50 is the only element falling in this range.

Figure 5:
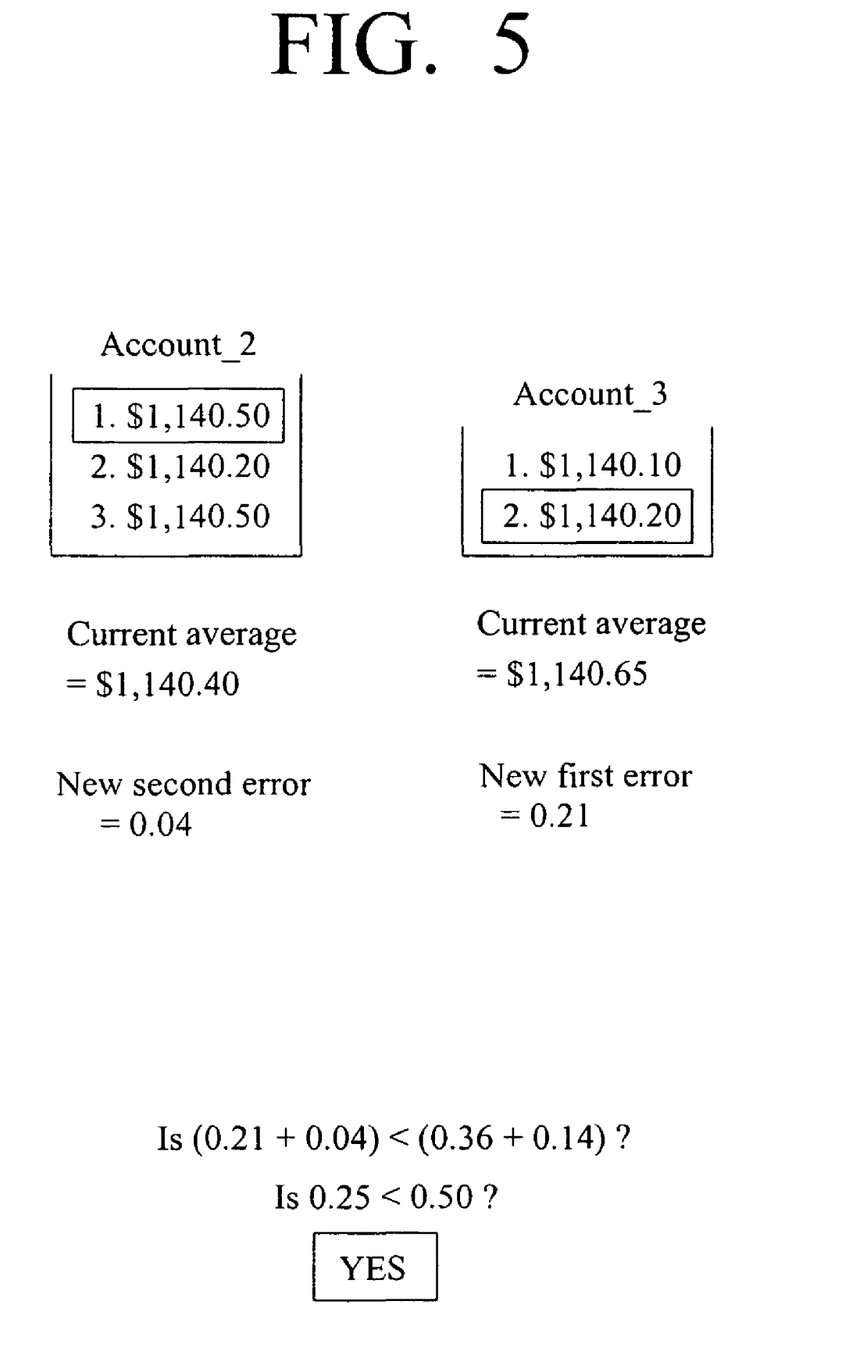
FIG. 5 is an illustration of the client accounts of FIG. 4 following exchange of the selected instruments, and analysis of the distribution following the exchange.

FIG. 5 shows ACCOUNT_2 and ACCOUNT_3 with the selected instruments exchanged. Then, a new first error and a new second error can be calculated. Thus, the new first error is calculated to be 0.21, and the new second error is calculated to be 0.04. Then, it can be determined if the sum of the new first error and the new second error is less than the sum of the first error and the second error, such that the exchange has improved the distribution. The sum of the new first error and the new second error is 0.25, which is less than the sum of the first error and the second error, 0.50. Thus, the exchange has improved the distribution.

The exemplary method would then return to the step of sorting the new accounts into the three groups to reevaluate the distribution and attempt further improvement. As described in the exemplary method, this process would continue until no further improvements can be made to the accounts by exchanging any combination of instruments.

Also, as mentioned, the method will likely be used to manage tens or hundreds of accounts, with hundreds or thousands of total instruments to be distributed. While a greater number of accounts and instruments will increase the number of iterations of the method to reach a condition where no further improvements can be made, the larger numbers will also result in better distributions, thus substantially eliminating the need to account for any cash residuals between the account average values and the average instrument value.

Figure 6:
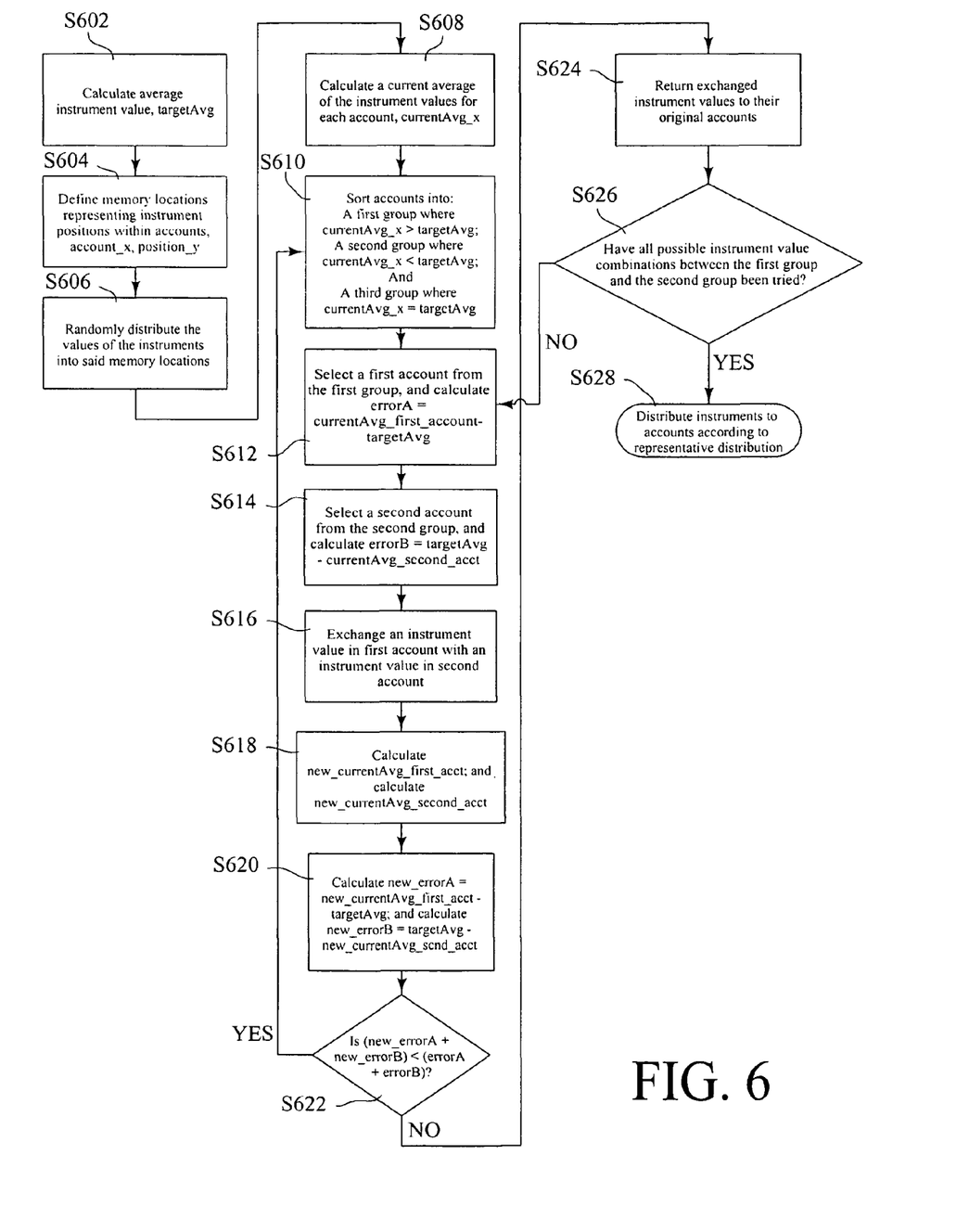
FIG. 6 is a flow chart of an exemplary method performed on a computing device for equitably distributing a plurality of instruments between a plurality of accounts, also according to the invention.

FIG. 6 is a flow chart of an exemplary method performed on a computing device for equitably distributing a plurality of instruments between a plurality of accounts, also according to the invention. More specifically, the method of FIG. 6 includes the steps of: S602 calculating an average instrument value (targetAvg) for all of the instruments; S604 defining memory locations (account_x, position_y) representing the accounts and instrument positions within the accounts; S606 randomly distributing the values of the instruments into the memory locations, thus creating a representative distribution of the instruments; and S608 calculating current average instrument values for each representative account (currentAvg_x).

Then, the process of evaluating the distribution proceeds with S610 sorting the representative accounts into: a first group where the average account values are greater than the average instrument value (currentAvg_x>targetAvg); a second group where the average account values are less than the average instrument value (currentAvg_x<targetAvg); and a third group where the average account values are equal to the average instrument value (currentAvg_x=targetAvg).

Then, improvement of the distribution is attempted using the following steps: S612 selecting a first representative account from the first group, and calculating errorA as the difference between the average value for the first account and the average instrument value; S614 selecting a second representative account from the second group, and calculating errorB as the difference between the average instrument value and the average value for the second account; S616 exchanging an instrument value in the second account with an instrument value in the first account; S618 calculating new average values for each of the first account and the second account (new_currentAvg_first_acct and new_currentAvg_second_acct); S620 calculating new_errorA as the difference between the new average value for the first account and the average instrument value (new_currentAvg_first_acct−targetAvg), and calculating new_errorB as the difference between the average instrument value and the new average value for the second account (targetAvg−new_currentAvg_second_acct); S622 determining if new_errorA plus new_errorB is less than errorA plus errorB, such that the exchange has resulted in an improved distribution: if so, then returning to step S610 to reevaluate the improved distribution and attempt further improvement; and if not, then S624 returning the exchanged instrument values to their original accounts; S626 determining if all possible instrument value combinations between the first group and the second group have been tried: if not, then returning to step S612 to select a different instrument value combination; and if so, then S628 distributing the instruments to the accounts according to the representative distribution.

To improve or speed up the process, step S612 could include selecting the representative account with the largest average instrument value from the first group, and the step S614 could include selecting the representative account with the smallest average instrument value. Then, step S616 could include selecting a second instrument value in the second account; selecting a first instrument value in the first account having a value between the value of the second instrument and the value of the second instrument plus two times the number of instruments in the second account times the result of: the difference between the average instrument value and the current average value for the second account; and exchanging the second instrument value with the first instrument value. Further, where there are at least two instrument values in the first account that fall within the range described, the step of exchanging instrument values includes selecting the smallest instrument value within the range described in the first account as the first instrument value.

Figure 7:
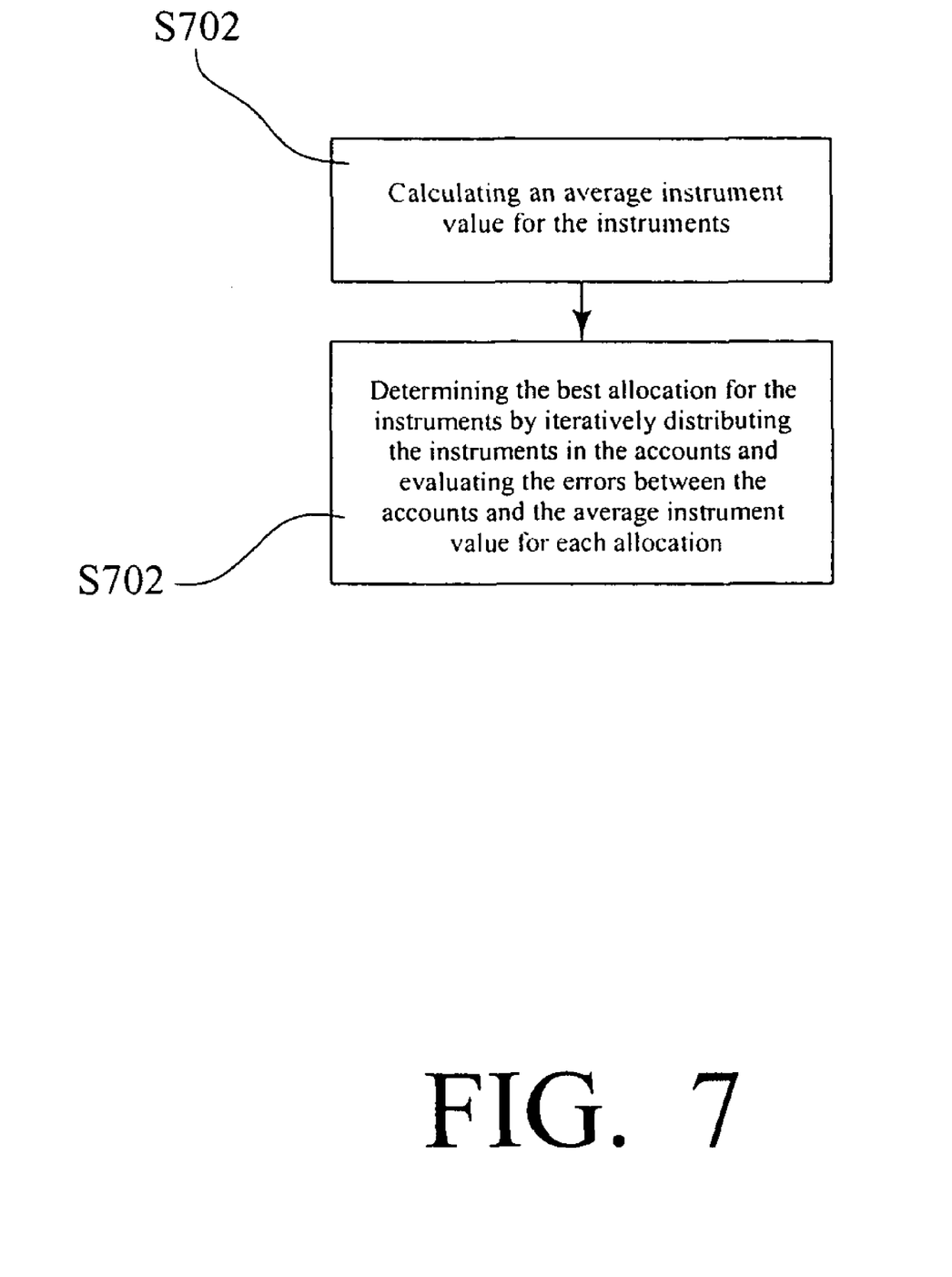
FIG. 7 is a flow chart of another exemplary method for equitably distributing a plurality of instruments between a plurality of accounts.

FIG. 7 is a flow chart of another exemplary method for equitably distributing a plurality of instruments between a plurality of accounts, also according to the invention. The method of FIG. 7, in its most basic form, comprises the steps of: S702 calculating an average instrument value for the instruments; and S704 determining the best allocation for the instruments by iteratively distributing the instruments in the accounts and evaluating the errors between the accounts and the average instrument value for each allocation. The best allocation, of course, will have the smallest overall error, or sum of errors, between each account and the average instrument value. Ideally, there will be at least one allocation that produces a distribution having no error. This iterative approach of distribution instruments or instrument values and comparing errors allows this and the other exemplary methods of the invention to determine the best allocation for the instruments.

Figure 8:
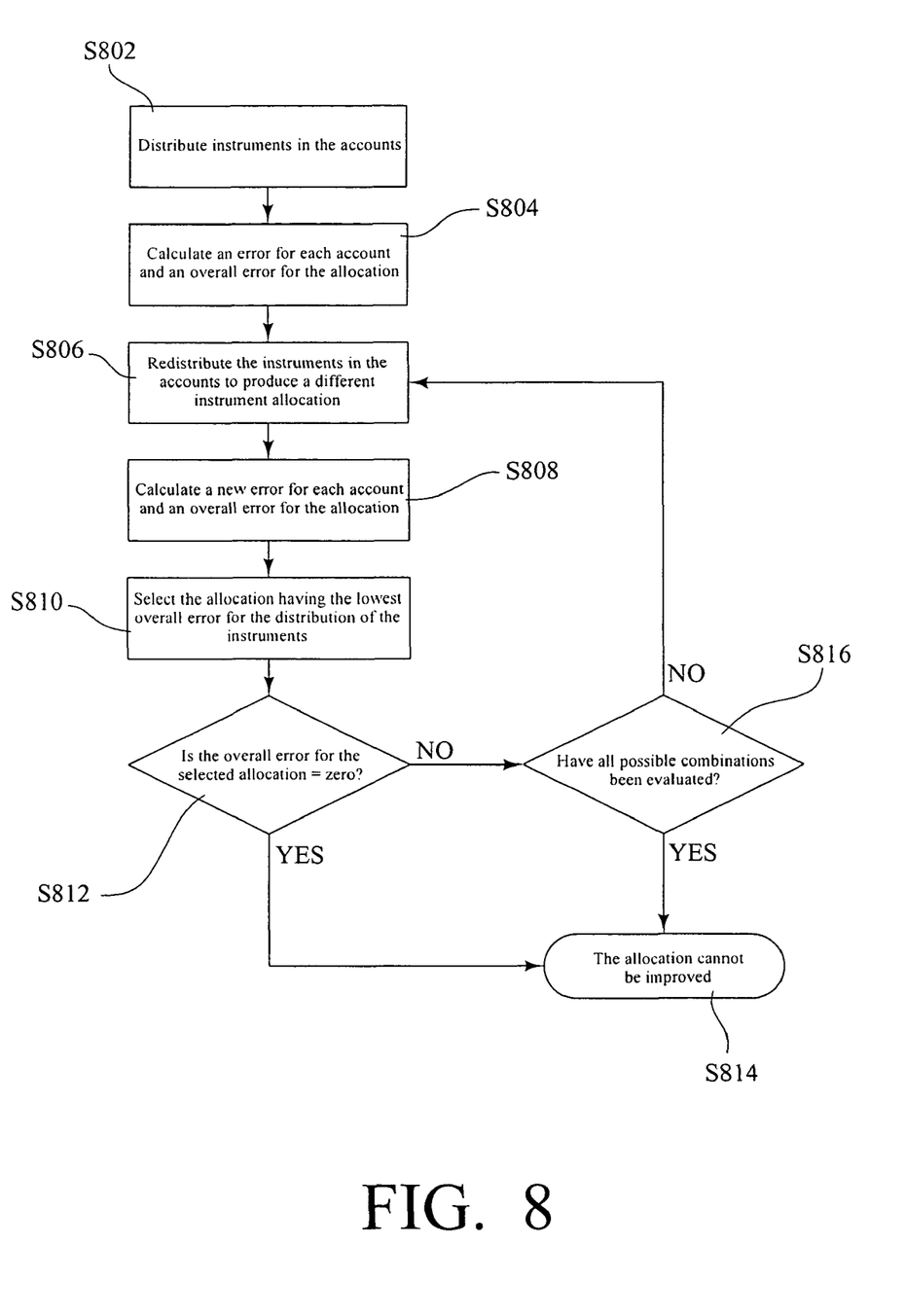
FIG. 8 is a flow chart of steps for determining the best allocation for instruments by iteratively distributing the instruments in accounts and evaluating the errors between the accounts and the average instrument value for each allocation.

FIG. 8 is a flow chart of steps for determining the best allocation for instruments by iteratively distributing the instruments in accounts and evaluating the errors between the accounts and the average instrument value for each allocation, which is one possible expansion of step S702. Thus, the steps include: S802 distributing the instruments in the accounts; S804 calculating an error for each account and an overall error for the allocation; S806 redistributing the instruments in the accounts to produce a different instrument allocation; S808 calculating a new error for each account and an overall error for the allocation; and S810 selecting the allocation having the lowest overall error for distribution of the instruments. The error calculations for each account are understood to be absolute value calculations, in order to produce an absolute overall error for comparison purposes. The overall error for each allocation, then, is the sum of the individual errors for each account.

Additional iterations will include the additional step of S812 determining if the overall error for the selected allocation is zero. If the overall error for the selected allocation is zero, then the average value of each account equals the average instrument value, and the next step S814 is to stop, since no further improvements can be made. However, if the overall error for the selected allocation is not zero, then the next step S816 is to determine if all possible allocations have been evaluated. If all possible allocations have been evaluated, then the next step S814 is again to stop, since no further improvements can be made. However, if all possible allocations have not been evaluated, the iteration should continue with the step S806 of redistributing the instruments in the accounts to produce a different instrument allocation and proceeding with evaluation of that allocation in comparison to the previously selected allocation.

Figure 9:
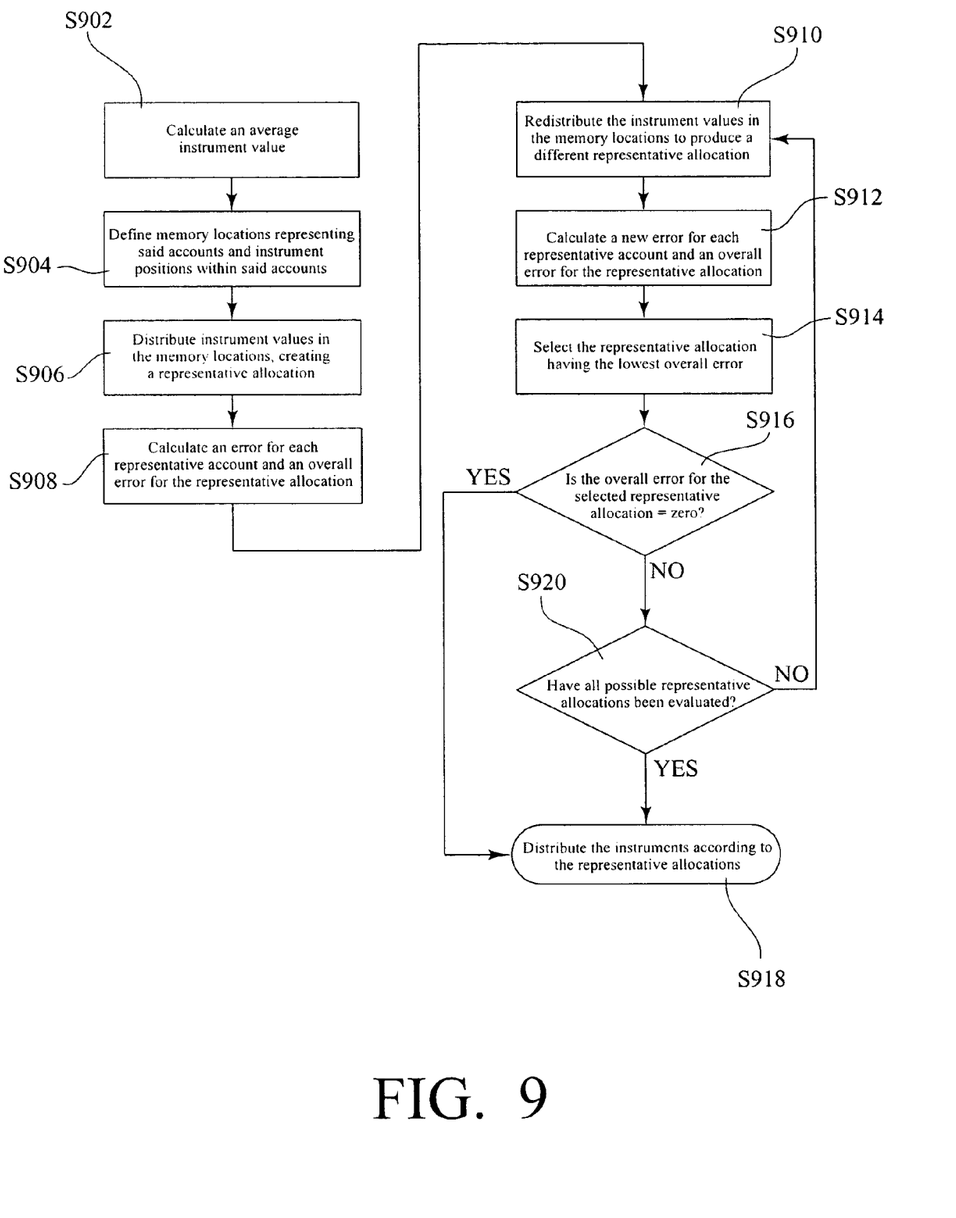
FIG. 9 is a flow chart of another exemplary method performed on a computing device for equitably distributing a plurality of instruments between a plurality of accounts.

FIG. 9 is a flow chart of a similar exemplary method for equitably distributing a plurality of instruments between a plurality of accounts, and performed on a computing device. Thus, the method shown in FIG. 9 includes the steps of: S902 calculating an average instrument value for all of the instruments; S904 defining memory locations representing the accounts and instrument positions within the accounts; S906 distributing the values of the instruments into the memory locations, thus creating a representative allocation of the instruments; S908 calculating an error for each representative account and an overall error for the representative allocation; S910 redistributing the values of the instruments into the memory locations to produce a different representative allocation; S912 calculating a new error for each representative account and a new overall error for the representative allocation; and S914 selecting the representative allocation having the lowest overall error for distributing the instruments to the accounts.

Again, additional iterations will include the additional step of S916 determining if the overall error for the selected representative allocation is zero. If the overall error for the selected representative allocation is zero, then the next step S918 is to distribute the instruments according to the representative allocation, since no further improvements can be made. However, if the overall error for the selected representative allocation is not zero, then the next step S920 is to determine if all possible representative allocations have been evaluated. If all possible representative allocations have been evaluated, then the next step S918 is again to distribute the instruments according to the representative allocation, since no further improvements can be made. However, if all possible allocations have not been evaluated, the iteration should continue with the step S910 of redistributing the values of the instruments in the memory locations to produce a different representative allocation and proceeding with evaluation of that representative allocation in comparison to the previously selected representative allocation.

As mentioned above, the steps of the invention may also be found as executable instructions in computer software contained on a computer readable medium.

Thus, the invention provides a method for equitably distributing a plurality of instruments between a plurality of accounts. One of ordinary skill in the art will recognize that additional configurations are possible without departing from the teachings of the invention or the scope of the claims which follow. This detailed description, and particularly the specific details of the exemplary embodiments disclosed, is given primarily for clearness of understanding and no unnecessary limitations are to be understood therefrom, for modifications will become obvious to those skilled in the art upon reading this disclosure and may be made without departing from the spirit or scope of the claimed invention.

What is claimed is:

1. A method performed on a computing device for distributing a plurality of financial instruments between a plurality of accounts, said method comprising:
   calculating and storing in a memory location an average instrument value for said plurality of financial instruments; and
   determining and storing in a memory location a distribution of said plurality of financial instruments among said plurality of accounts, said distribution determined by iteratively allocating said instruments among said accounts to decrease a total of: differences between a current average instrument value for each of the accounts and the average instrument value for said plurality of instruments.

2. The method of claim 1, further comprising:
   a) allocating said instruments among the accounts;
   b) calculating and storing in a memory location an error for each account and an overall error for the allocation, wherein said error for each account is based on a difference between a current average instrument value for said account and the average instrument value for said plurality of instruments, and wherein said overall error for the allocation is based on a sum of said errors for each account;
   c) reallocating the instruments in the accounts to produce a different instrument allocation;
   d) calculating and storing in a memory location a new error for each account and a new overall error for the different instrument allocation; and
   e) after steps c) and d) have been performed for at least two possible allocations, selecting as said distribution and storing in a memory location an allocation having a lowest overall error, and allocating the instruments according to the selected allocation.

3. The method of claim 2, further comprising:
   f) determining whether the overall error for a possible allocation is zero, and if so, then selecting that possible allocation as the distribution.

4. A method performed on a computing device for distributing a plurality of instruments between a plurality of accounts, said method comprising:

a) calculating an average instrument value for all of the instruments;
b) defining memory locations representing said accounts and instrument positions within said accounts;
c) allocating the values of said instruments into said memory locations, thus creating a representative allocation of said instruments;
d) calculating an error for each representative account and an overall error for the representative allocation, wherein said error for each account is based on a difference between a current average instrument value for said account and the average instrument value, and wherein said overall error for the allocation is based on a sum of said errors for each account;
e) reallocating the values of said instruments into said memory locations to produce a different representative allocation;
f) calculating a new error for each representative account and a new overall error for the different representative allocation; and
g) after steps e) and f) have been performed for at least two possible allocations, selecting as said distribution a representative allocation having a lowest overall error, and allocating the instruments according to the selected allocation.

5. The method of claim 4 further comprising:
h) determining whether the overall error for a possible representative allocation is zero, and if so, then selecting that possible representative allocation as the distribution.

6. A method performed on a computing device for distributing a plurality of instruments between a plurality of accounts, said method comprising:
a) calculating and storing in a memory location an average instrument value for said instruments;
b) allocating the instruments randomly into instrument positions in the plurality of accounts;
c) sorting said accounts into:
    a first group where a current average value of the account is greater than the average instrument value;
    a second group where a current average value of the account is less than the average instrument value; and
    a third group where a current average value of the account is equal to the average instrument value;
d) selecting a first account from the first group and a second account from the second group;
e) calculating and storing in a memory location a first error based on a difference between a current average value for the first account and the average instrument value, and a second error based on a difference between the average instrument value and a current average value for the second account;
f) exchanging an instrument in the second account with an instrument in the first account;
g) calculating and storing in a memory location a new first error as an absolute value of a difference between a new current average value for the first account and the average instrument value, and a new second error as an absolute value of a difference between the average instrument value and a new current average value for the second account;
h) determining whether a sum of the new first error and the new second error is less than a sum of the first error and the second error; and if so, then reapplying step c) to reevaluate the distribution and attempt further improvement; and if not, then returning the exchanged instruments to their respective accounts; and i) determining whether all possible instrument combinations between all accounts in the first group and all accounts in the second group have been evaluated; and if not, then reapplying step d) to select a different instrument combination; and if so, then stopping.

7. The method of claim 6, wherein step d) includes selecting an account with the largest current average from said first group and selecting an account with the smallest current average from said second group, and wherein step f) includes:
    selecting a second instrument in said second account;
    selecting a first instrument in said first account having a value within a range comprising the value of the second instrument and the value of the second instrument plus two times a number of instruments in the second account times a result of: the difference between the average instrument value and the current average value for the second account; and
    exchanging said second instrument with said first instrument.

8. The method of claim 7, wherein there are at least two instruments in said first account that have a value within the range, wherein step f) includes selecting a smallest instrument within the range described in said first account as said first instrument.

9. A method performed on a computing device for distributing a plurality of instruments between a plurality of accounts, said method comprising the steps of:
a) calculating an average instrument value for all of the instruments;
b) defining memory locations representing said accounts and instrument positions within said accounts;
c) randomly allocating values of said instruments into said memory locations to create a representative allocation of said instruments;
d) calculating an account average instrument value for each representative account;
e) sorting said representative accounts into:
    a first group where the average account values are greater than an overall average instrument value;
    a second group where the average account values are less than the overall average instrument value; and
    a third group where the average account values are equal to the overall average instrument value;
f) selecting a first representative account from said first group, and calculating errorA as a difference between the average value for the first account and the average instrument value;
g) selecting a second representative account from said second group, and calculating errorB as a difference between the average instrument value and the average value for the second account;
h) exchanging an instrument value in said second account with an instrument value in said first account, and calculating new average values for each of said first account and said second account;
i) calculating new_errorA as a difference between the new average value for the first account and the average instrument value; and calculating new_errorB as a difference between the average instrument value and the new average value for the second account;
j) determining if new_errorA plus new_errorB is less than errorA plus errorB, such that the exchange has resulted in an improved allocation and, if so, then returning to step e) to reevaluate the improved allocation and attempt further improvement; and if not, then returning the exchanged instrument values to their original accounts;

k) determining if all possible instrument value combinations between the first group and the second group have been tried and, if not, then returning to step f) to select a different instrument value combination; and if so, then distributing said instruments to said accounts according to said representative allocation.

10. The method of claim 9, wherein step f) includes selecting an account with the largest average instrument value, wherein step g) includes selecting the account with a smallest average instrument value, and wherein step h) comprises:
   selecting a second instrument value in said second account;
   selecting a first instrument value in said first account having a value within a range comprising the value of the second instrument and the value of the second instrument plus two times a number of instruments in the second account times a result of: a difference between the overall average instrument value and the account average instrument value for the second account; and
   exchanging said second instrument value with said first instrument value.

11. The method of claim 10, wherein there are at least two instrument values in said first account that fall within the range, wherein step h) includes selecting the smallest instrument value within the range described in said first account as said first instrument value.

12. A computer readable storage medium having stored thereon computer executable instructions which, when executed by a processor, perform a method for distributing a plurality of instruments between a plurality of accounts, said method comprising:
   a) calculating and storing in a memory location an average instrument value for said instruments;
   b) allocating the instruments randomly into instrument positions in the accounts;
   c) sorting said accounts into:
      a first group where a current average value of the account is greater than average instrument value;
      a second group where a current average value of the account is less than average instrument value; and
      a third group where a current average value of the account is equal to the average instrument value;
   d) selecting a first account from the first group and a second account from the second group;
   e) calculating and storing in a memory location a first error as the difference between a current average value for the first account and the average instrument value, and a second error as the difference between the average instrument value and a current average value for the second account;
   f) exchanging an instrument in the second account with an instrument in the first account;
   g) calculating and storing in a memory location a new first error as a absolute value of a difference between a new current average value for the first account and the average instrument value, and a new second error as an absolute value of a difference between the average instrument value and a new current average value for the second account;
   h) determining if a sum of the new first error and the new second error is less than a sum of the first error and the second error, such that the exchange has improved the distribution; if so, then returning to step c) to reevaluate the distribution and attempt further improvement; and if not, then returning the exchanged instruments to their respective accounts; and
   i) determining if all possible instrument combinations between the first group and the second group have been evaluated; if not, then returning to step d) to select a different instrument combination; and if so, then stopping as no further improvements can be made.

13. The computer readable storage medium of claim 12, wherein step d) includes selecting an account with the largest current average from said first group and selecting an account with the smallest current average from said second group, and wherein step f) includes:
   selecting a second instrument in said second account;
   selecting a first instrument in said first account having a value within a range comprising between the value of the second instrument and the value of the second instrument plus two times a number of instruments in the second account times a result of: the difference between the average instrument value and the current average value for the second account; and
   exchanging said second instrument with said first instrument.

14. The computer readable storage medium of claim 13, wherein there are at least two instruments in said first account that have a value within the range, wherein step f) includes selecting a smallest instrument within the range described in said first account as said first instrument.

15. A computer readable storage medium having stored thereon computer executable instructions which, when executed by a processor, perform a method for distributing a plurality of instruments between a plurality of accounts, said method comprising:
   calculating and storing in a memory location an average instrument value for said plurality of financial instruments; and
   determining and storing in a memory location a distribution of said plurality of financial instruments among said plurality of accounts, said distribution determined by iteratively allocating said instruments among said accounts to decrease a total of: differences between a current average instrument value for each of the accounts and the average instrument value for said plurality of instruments.

16. The computer readable storage medium of claim 15, wherein the method further comprises:
   a) allocating said instruments among the accounts;
   b) calculating and storing in a memory location an error for each account and an overall error for the allocation, wherein said error for each account is based on a difference between a current average instrument value for said account and the average instrument value for said plurality of instruments, and wherein said overall error for the allocation is based on a sum of said errors for each account;
   c) reallocating the instruments in the accounts to produce a different instrument allocation;
   d) calculating and storing in a memory location a new error for each account and a new overall error for the different instrument allocation; and
   e) after steps c) and d) have been performed for at least two possible allocations, selecting as said distribution and storing in a memory location an allocation having a lowest overall error, and allocating the instruments according to the selected allocation.

17. The computer readable storage medium of claim 16, wherein the method further comprises:
   f) determining whether the overall error for a possible allocation is zero, and if so, then selecting that possible allocation as the distribution.

18. A computer readable storage medium having stored thereon computer executable instructions which, when executed by a processor, perform a method for distributing a plurality of instruments between a plurality of accounts, said method comprising:

a) calculating an average instrument value for all of the instruments;

b) defining memory locations representing said accounts and instrument positions within said accounts;

c) allocating the values of said instruments into said memory locations, thus creating a representative allocation of said instruments;

d) calculating an error for each representative account and an overall error for the representative allocation, wherein said error for each account is based on a difference between a current average instrument value for said account and the average instrument value, and wherein said overall error for the allocation is based on a sum of said errors for each account;

e) reallocating the values of said instruments into said memory locations to produce a different representative allocation;

f) calculating a new error for each representative account and a new overall error for the different representative allocation; and g) after steps e) and f) have been performed for at least two possible allocations, selecting as said distribution a representative allocation having a lowest overall error, and allocating the instruments according to the selected allocation.

19. The computer readable storage medium of claim 18, wherein the method further comprises:

h) determining whether the overall error for a possible representative allocation is zero, and if so, then selecting that possible representative allocation as the distribution.

20. A computer readable storage medium having stored thereon computer executable instructions which, when executed by a processor, perform a method for distributing a plurality of instruments between a plurality of accounts, said method comprising:

a) calculating an average instrument value for all of the instruments;

b) defining memory locations representing said accounts and instrument positions within said accounts;

c) randomly allocating values of said instruments into said memory locations to create a representative allocation of said instruments;

d) calculating an account average instrument value for each representative account;

e) sorting said representative accounts into:
   a first group where the average account values are greater than an overall average instrument value;
   a second group where the average account values are less than the overall average instrument value; and
   a third group where the average account values are equal to the overall average instrument value;

f) selecting a first representative account from said first group, and calculating errorA as a difference between the average value for the first account and the average instrument value;

g) selecting a second representative account from said second group, and calculating errorB as a difference between the average instrument value and the average value for the second account;

h) exchanging an instrument value in said second account with an instrument value in said first account, and calculating new average values for each of said first account and said second account;

i) calculating new_errorA as a difference between the new average value for the first account and the average instrument value; and calculating new_errorB as a difference between the average instrument value and the new average value for the second account;

j) determining if new_errorA plus new_errorB is less than errorA plus errorB, such that the exchange has resulted in an improved allocation and, if so, then returning to step e) to reevaluate the improved allocation and attempt further improvement; and if not, then returning the exchanged instrument values to their original accounts;

k) determining if all possible instrument value combinations between the first group and the second group have been tried and, if not, then returning to step f) to select a different instrument value combination; and if so, then distributing said instruments to said accounts according to said representative allocation.

21. The computer readable storage medium of claim 20, wherein step f) includes selecting an account with the largest average instrument value, wherein step g) includes selecting an account with the smallest average instrument value, and wherein step h) comprises:

selecting a second instrument value in said second account;

selecting a first instrument value in said first account having a value within a range comprising the value of the second instrument and the value of the second instrument plus two times a number of instruments in the second account times a result of: a difference between the overall average instrument value and the account average instrument value for the second account; and exchanging said second instrument value with said first instrument value.

22. The computer readable storage medium of claim 21, wherein there are at least two instrument values in said first account that fall within the range, wherein step h) includes selecting the smallest instrument value within the range described in said first account as said first instrument value.

* * * * *